United States Patent [19]
Redekop

[11] Patent Number: 6,019,178
[45] Date of Patent: Feb. 1, 2000

[54] FIELD MARKER

[75] Inventor: John Redekop, Plum Coulee, Canada

[73] Assignee: GAP Ag. Ltd, Fargo, N. Dak.

[21] Appl. No.: 08/969,749

[22] Filed: Nov. 13, 1997

Related U.S. Application Data

[63] Continuation-in-part of application No. 08/617,351, Mar. 18, 1996, Pat. No. 5,785,128.

[51] Int. Cl.⁷ .................................................. A01B 69/02
[52] U.S. Cl. ............................................................ 172/126
[58] Field of Search ..................................... 172/126, 456

[56] References Cited

U.S. PATENT DOCUMENTS

| | | | |
|---|---|---|---|
| 4,030,551 | 6/1977 | Boetto et al. | 172/126 |
| 4,063,597 | 12/1977 | Day | 172/126 |
| 4,379,491 | 4/1983 | Riewerts et al. | 172/456 X |
| 4,986,367 | 1/1991 | Kinzenbaw | 172/126 |
| 5,408,756 | 4/1995 | Wahls | 172/126 X |
| 5,425,427 | 6/1995 | Haugen | 172/126 |

*Primary Examiner*—Christopher J. Novosad
*Attorney, Agent, or Firm*—Michael S. Neustel

[57] ABSTRACT

A field marker for easily and compactly folding to and from an implement with relatively few moving components. The inventive device includes an inner arm pivotally attached to a bracket structure attachable to a side of an implement, an outer arm pivotally attached to the inner arm, a marking disc journaled to a distal end of the outer arm, a first hydraulic cylinder attached between the bracket structure and the inner arm, a second hydraulic cylinder attached between the inner arm and the outer arm, and wherein the first and second hydraulic cylinders are fluidly connected in series so as to simultaneously extend and simultaneously retract the inner and outer arms. The inner arm is preferably rotatable about a substantially horizontal plane and the outer arm is preferably rotatable about a substantially vertical plane. The first hydraulic cylinder is larger than the second hydraulic cylinder to compensate for displaced hydraulic fluid by the shaft of the first hydraulic cylinder.

18 Claims, 4 Drawing Sheets

FIELD MARKER

CROSS-REFERENCE TO RELATED PATENT APPLICATION

This application is a continuation-in-part of prior patent application Ser. No. 08/617,351, filed Mar. 18, 1996, now U.S. Pat. No. 5,785,128, entitled 'Field Marker'.

BACKGROUND OF THE INVENTION

1. Field of the Invention

The present invention relates generally to folding field markers and more specifically it relates to a field marker for easily and compactly folding to and from an implement with relatively few moving components.

2. Description of the Prior Art

There are numerous folding field markers. For example, U.S. Pat. Nos. 4,063,597; 5,408,756; 5,425,427; Canadian Patent 1,202,529 and Canadian Patent 1,300,433 are all illustrative of such prior art. All of these inventions utilize four-bar linkages or cable mechanisms to fold an outer arm relative to an inner arm which are overly complex for practical utilization.

While these devices may be suitable for the particular purpose to which they address, they are not as suitable for easily and compactly folding to an implement with relatively few moving components. The prior inventions are overly complex with many components. Because of the increased number of components in the prior art inventions, there is also an increased number of repairs and maintenance required.

In these respects, the field marker according to the present invention substantially departs from the conventional concepts and designs of the prior art, and in so doing provides an apparatus primarily developed for the purpose of easily and compactly folding to an implement with relatively few moving components thereby reducing down time when in the field.

SUMMARY OF THE INVENTION

A primary object of the present invention is to provide a field marker that will overcome the shortcomings of the prior art devices.

Another object is to provide a field marker that is simple to operate.

An additional object is to provide a field marker that is foldable into a compact storage position.

A further object is to provide a field marker that has relatively few components thereby reducing down time for repairs and maintenance.

Another object is to provide a field marker that utilizes a pair of hydraulic cylinders connected in series to fold an outer arm and an inner arm compactly to an implement.

An additional object is to provide a field marker that preferably folds parallel to and a finite distance above the side of the implement.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
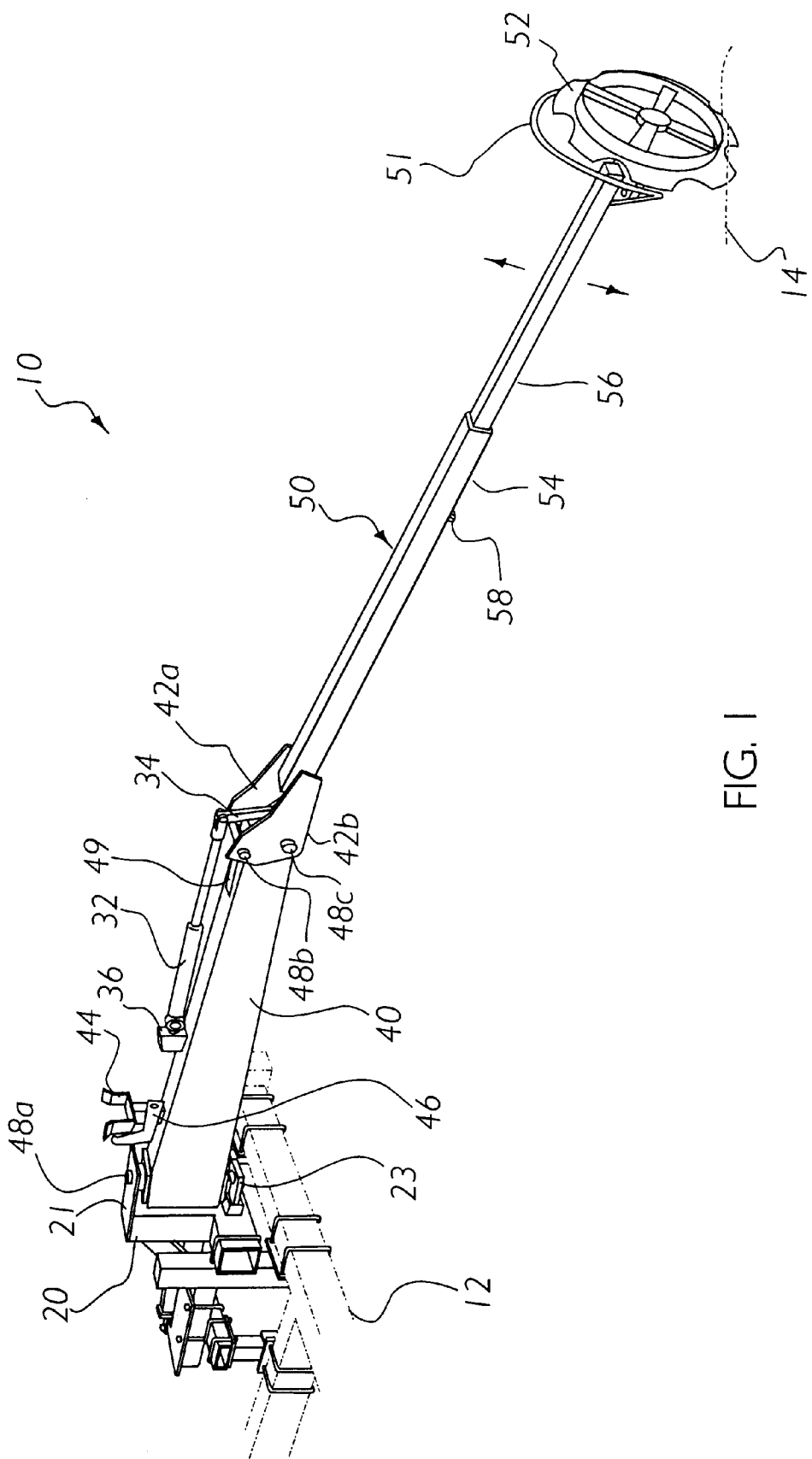
FIG. 1 is an upper perspective view of the present invention attached to an implement and fully extended.

Turning now descriptively to the drawings, in which similar reference characters denote similar elements throughout the several view, FIGS. 1 through 4 illustrate a field marker 10, which comprises an inner arm 40 pivotally attached to a mounting bracket 20 attachable to a side of an implement frame 12, an outer arm 50 pivotally attached to the inner arm 40, a marking disc 52 journaled to a distal end of the outer arm 50, a first hydraulic cylinder 30 attached between the bracket structure and the inner arm 40, a second hydraulic cylinder 32 attached between the inner arm 40 and the outer arm 50, and wherein the first and second hydraulic cylinders 30, 32 are fluidly connected in series so as to simultaneously extend and simultaneously retract the inner and outer arms 40, 50. The inner arm 40 is preferably rotatable about a substantially horizontal plane and the outer arm 50 is preferably rotatable about a substantially vertical plane. The first hydraulic cylinder 30 is larger than the second hydraulic cylinder 32 to compensate for displaced hydraulic fluid by the shaft of the first hydraulic cylinder 30. The field marker 10 is suitable for both sides of the implement 12 for marking the ground surface 14 on the selected side.

Figure 2:
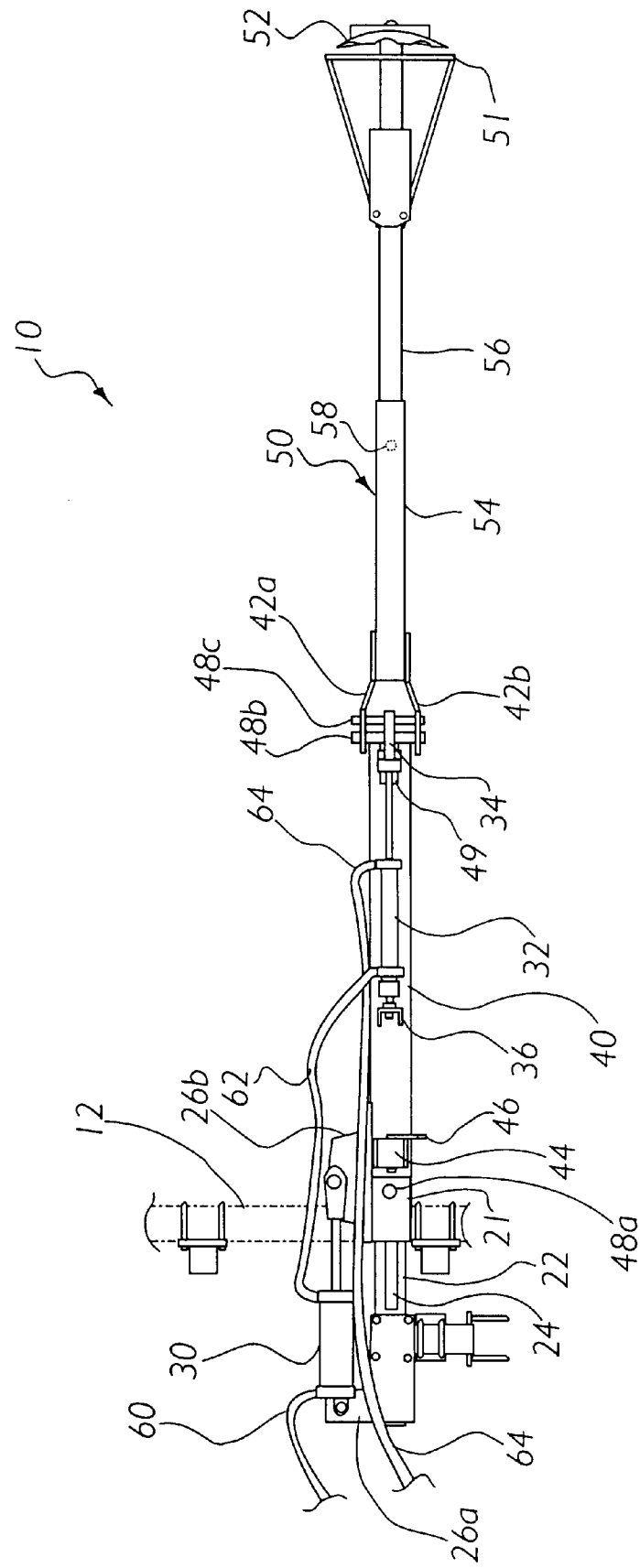
FIG. 2 is a top view of the present invention fully extended.

As best shown in FIG. 2 of the drawings, the mounting bracket 20 has an upper arm 21 and a lower arm 23 distally spaced apart and parallel to one another. An extended member 22 projects from the mounting bracket 20 a finite distance along a horizontal plane and orthogonally to the mounting bracket 20 as best shown in FIG. 2 of the drawings. A brace 24 is attached at an angle between the mounting bracket 20 and the extended member 22 for reinforcing the mounting bracket 20. A side member 26a is attached to the distal end of the extended member 22 for receiving a first end of the first hydraulic cylinder 30. The mounting bracket 20, including the extended member 22, are attachable to an implement frame 12 by unnumbered U-clamps as shown in FIGS. 1–4 of the drawings.

Figure 3:
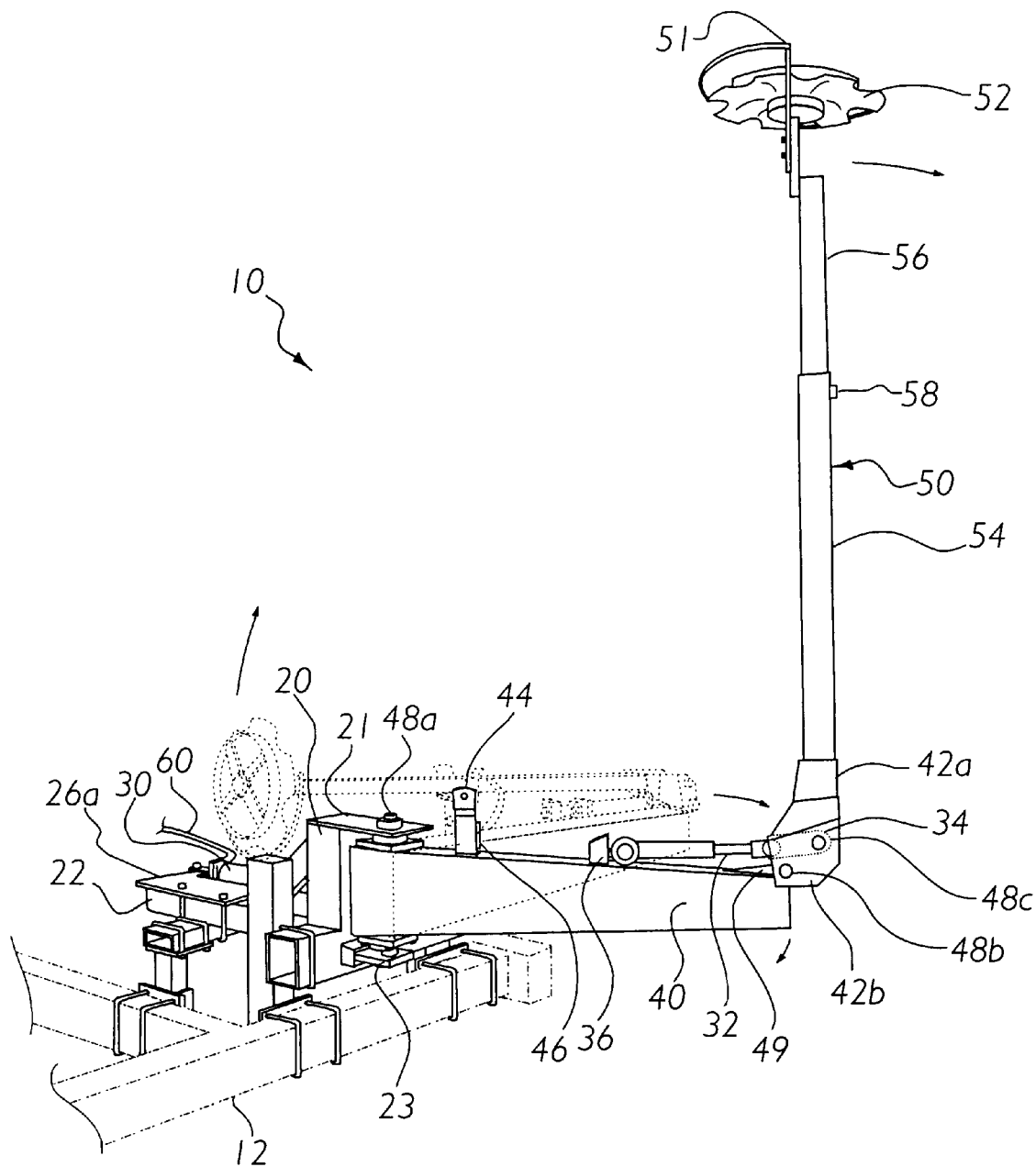
FIG. 3 is an upper perspective view of the present invention partially folded and fully folded.
Figure 4:
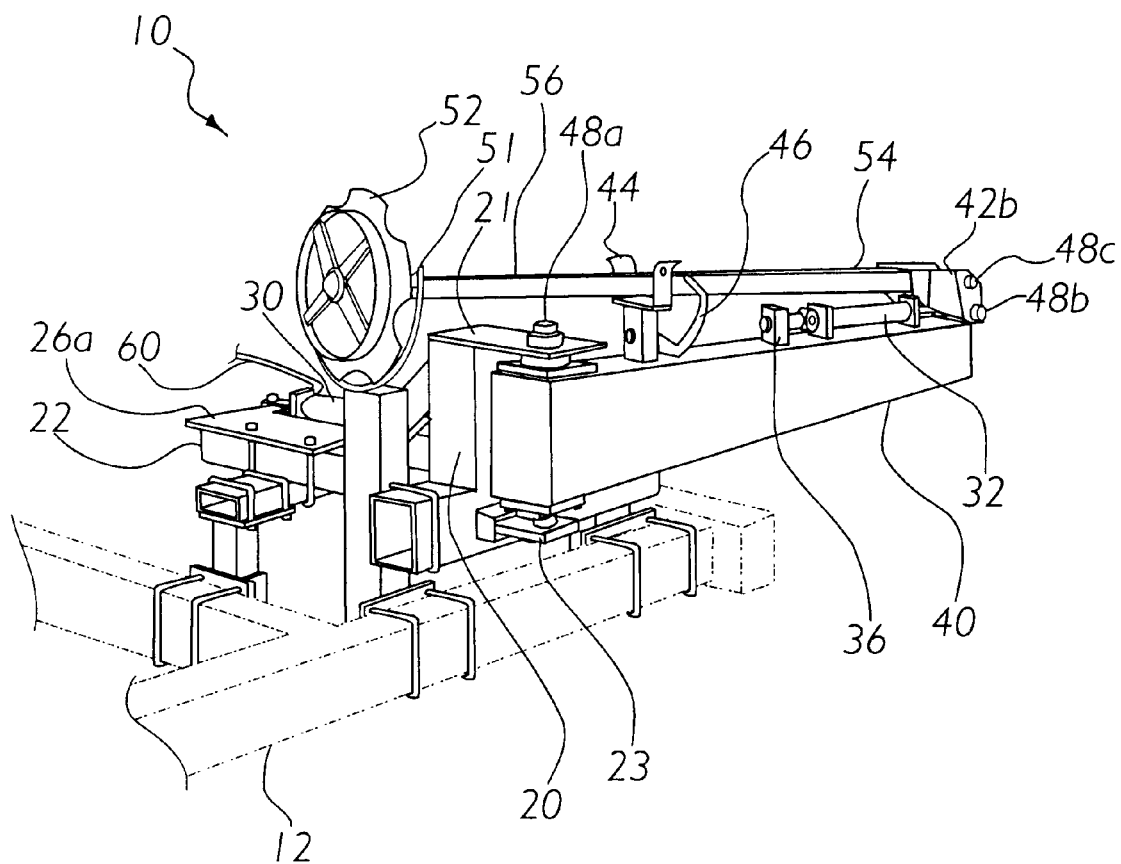
FIG. 4 is an upper perspective view of the present invention completely folded into a storage position.

As shown in FIGS. 1, 2 and 4 of the drawings, the inner arm 40 is pivotally attached at one end between the upper arm 21 and the lower arm 23 of the mounting bracket 20 by a pin 48a. The inner arm 40 preferably rotates along a substantially horizontal plane as best shown in FIG. 3, however, the inner arm 40 may rotate along various planes including vertical planes. As shown in FIG. 2 of the drawings, a side member 26b is attached to a side portion of the inner arm 40 for receiving the first hydraulic cylinder 30. A Y-shaped support member 44 is attached to the upper surface of the inner arm 40 for catchably receiving the outer arm 50 when in the storage position. A locking member 46 is pivotally attached to the inner arm 40 adjacent the Y-shaped support member 44 for selectively locking the outer arm 50 in the storage position onto the Y-shaped support member 44.

As shown in FIG. 1–4 of the drawings, a pair of elbow members 42a–b are pivotally attached at one end to the distal end of the inner arm 40 by a pin 48b. The outer arm 50 is attached between the pair of elbow members 42a–b as best shown in FIG. 2 of the drawings. The outer arm 50 comprises an outer tube 54 attached between the elbow member 42a–b. An inner member 56 is slidably received within a lumen of the outer tube 54 for allowing adjustment of the length of the field marker 10 depending upon the width of the implement frame 12. As best shown in FIG. 3, the outer arm 50 preferably pivots along a substantially vertical plane substantially parallel to the inner arm 40. An adjustment fastener 58 is threadably engaged to and projecting through the outer tube 54 for catchably engaging the inner member 56 thereby retaining the inner member 56 in a desired position with respect to the outer tube 54.

A marking disc 52 is journaled to the distal end of the inner member 56 as best shown in FIG. 2 of the drawings. A guard 51 is attached adjacent the distal end of the inner member 56 and is adjacent the marking disc 52 to protect individuals from the marking disc 52 as shown in FIGS. 2 and 3. The marking disc 52 is engageable to the ground surface 14 when the outer arm 50 is fully extended as shown in FIG. 1 of the drawings.

As shown in FIG. 2 of the drawings, the first end of the first hydraulic cylinder 30 is pivotally attached to the distal end of the side member 26a. The distal end of the shaft of the first hydraulic cylinder 30 is pivotally attached to the distal end of the side member 26b. A first line 60 is fluidly connectable to an unnumbered hydraulic system of a tractor at one end. The opposite end of the first line 60 is fluidly attached to the first end of the first hydraulic cylinder 30 as best shown in FIG. 2 of the drawings. The first line 60 acts as a supply/return line for the first hydraulic cylinder 30 depending upon the movement of the field marker 10. A second line 62 is fluidly attached to a second end of the first hydraulic cylinder 30 at one end. The opposite end of the second line 62 is fluidly attached to a first end of the second hydraulic cylinder 32 as shown in FIG. 2. The first hydraulic cylinder 30 is preferably a rephasing hydraulic cylinder in both extended and contracted positions.

As shown in FIGS. 1 and 2 of the drawings, a base member 36 is attached to an upper surface of the inner arm 40. The first end of the second hydraulic cylinder 32 is pivotally attached to the base member 36 as best shown in FIG. 3 of the drawings. An end of a connecting member 34 is pivotally attached to the distal end of the shaft of the second hydraulic cylinder 32 as best shown in FIGS. 1, 2 and 3 of the drawings. The opposite end of the connecting member 34 is pivotally connected between the elbow members 42a–b by a pin 48c as best shown in FIG. 3. The pin 48c is positioned between the pin 48b and the outer tube 54 to allow the connecting member 34 to leverage the outer arm 50 when the second hydraulic cylinder 32 is contracted or extended.

As best shown in FIGS. 1 and 3 of the drawings, a ramp 49 is attached to the upper surface of the inner arm 40 adjacent the pair of elbow members 42a–b. The ramp 49 prevents wearing on the inner arm 40 from the connecting member 34 sliding against it and allows the connecting member 34 to pass over the pin 48b when the second hydraulic cylinder 32 is fully extended. A third line 64 is fluidly connected to a second end of the second hydraulic cylinder 32 as shown in FIG. 2. The opposite end of the third line 64 is connected to the unnumbered hydraulic system of tractor and acts as a return/supply line for the second hydraulic cylinder 32 depending upon the movement of the field marker 10.

The first hydraulic cylinder 30 has a substantially larger diameter than the second hydraulic cylinder 32 as shown in FIG. 2 of the drawings. The larger diameter for the first hydraulic cylinder 30 compensates for the hydraulic fluid displaced by the shaft of the first hydraulic cylinder 30, thereby allowing the first and second hydraulic cylinders 30, 32 to extend and retract at the desired proportional speeds. During retracting of the field marker 10, the desired proportional speeds of the cylinders 30, 32 allow the inner arm 40 to be completely aligned with the implement frame 12 before the outer arm 50 is completely descended upon the Y-shaped support member 44. During extending of the field marker 10, the desired proportional speeds of the cylinders 30, 32 allow the inner arm 40 to be completely extended substantially orthogonally to the implement frame 12 a finite time before the outer arm 50 is fully descended onto the ground surface 14. The outer arm 50 is allowed to pivot with respect to the inner arm 40 when fully descended from the slack produced by the connecting member 34.

In use, to extend the field marker 10 the user manipulates a selected unnumbered control lever within the unnumbered hydraulic system of the tractor which controls a selected field marker 10. When the field marker 10 is in the storage position and it is desired to have the field marker 10 extended, hydraulic fluid flows from the unnumbered hydraulic system through the first line 60 into the first end of the first hydraulic cylinder 30. The first hydraulic cylinder 30 thereafter pivots the inner arm 40 away from implement frame 12. The extension of the shaft from the first hydraulic cylinder 30 forces hydraulic fluid from the second end of the first hydraulic cylinder 30 into the second line 62 where the hydraulic fluid enters the first end of the second hydraulic cylinder 32. The shaft of the second hydraulic cylinder 32, which is smaller in diameter than the first hydraulic cylinder 30, is also forced outwardly thereby pivoting the outer arm 50 outwardly away from the implement frame 12 along a vertical plane parallel to the inner arm 40. Hydraulic fluid is forced from the second end of the second hydraulic cylinder 32 into the third line 64 where it is returned to the unnumbered hydraulic system. When the outer arm 50 is being pivoted away from the implement frame 12, the connecting member 34 is slidably engaging the ramp 49 to prevent the connecting member 34 from engaging the pin 48b which is above the upper surface of the inner arm 40. When the inner arm 40 is fully extended outwardly from the implement frame 12, approximately 90 degrees, the outer arm 50 is approximately parallel to a horizontal plane of the inner arm 40. A rephasing orifice in the first hydraulic cylinder 30 allows hydraulic fluid from the hydraulic system to bypass through the first hydraulic cylinder 30 into the second hydraulic cylinder 32 thereby allowing the outer arm 50 to become fully extended. When the second hydraulic cylinder 32 is fully extended, the outer arm 50 is free to move upwardly and downwardly from the connecting member 34 capable of elevating the distal end of the shaft of the second hydraulic cylinder 32, thereby allowing the marking disc 52 to maintain contact with the ground surface 14 regardless of the terrain.

To fold the field marker 10 into a storage position the above process is simply reversed. Hydraulic fluid flows from the unnumbered hydraulic system through the third line 64 into the second end of the second hydraulic cylinder 32. The second hydraulic cylinder 32 thereafter pivots the outer arm 50 towards from implement frame 12. The retraction of the shaft from the second hydraulic cylinder 32 forces hydraulic fluid from the first end of the second hydraulic cylinder 32 into the second line 62 where the hydraulic fluid enters the second end of the first hydraulic cylinder 30. The shaft of the first hydraulic cylinder 30, which the first hydraulic cylinder 30 is smaller in diameter than the second hydraulic cylinder 32, is also forced inwardly thereby pivoting the inner arm 40 towards the implement frame 12 along a horizontal plane. Hydraulic fluid is forced from the first end of the first hydraulic cylinder 30 into the first line 60 where it is returned to the unnumbered hydraulic system. When the inner arm 40 is fully retracted parallel to and above the implement frame 12, approximately 90 degrees, the outer arm 50 is approximately parallel to a horizontal plane of the inner arm 40. A second rephasing orifice in the first hydraulic cylinder 30 allows hydraulic fluid from the hydraulic system to bypass through the first hydraulic cylinder 30 from the second hydraulic cylinder 32 thereby allowing the outer arm 50 to become fully retract into a storage position. When the second hydraulic cylinder 32 is fully retracted, the outer arm 50 rests upon the Y-shaped support member 44 and can be selectively locked into position by the locking member 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A field marker, comprising:
    an inner arm having a proximal end and a distal end, wherein said proximal end is pivotally attached to a bracket means which is attachable to an implement frame;
    an outer arm having a proximal end and a distal end, wherein said proximal end of said outer arm is pivotally attached to said distal end of said inner arm;
    a marking means attached to said distal end of said outer arm;
    a first hydraulic cylinder attached between said bracket means and said inner arm, wherein said first hydraulic cylinder pivots said inner arm with respect to said implement frame;
    a second hydraulic cylinder attached between said inner arm and said outer arm, wherein said second hydraulic cylinder pivots said outer arm with respect to said inner arm; and
    wherein said first hydraulic cylinder and said second hydraulic cylinder are fluidly connected in series to one another so that they operate substantially simultaneously to extend or retract said inner arm and said outer arm with respect to said implement frame.

2. The field marker of claim 1, including a connecting means attached between said second hydraulic cylinder and said outer arm, wherein said connecting means allows said outer arm to freely pivot with respect to said inner arm when fully extended.

3. The field marker of claim 2, wherein said inner arm pivots along a substantially horizontal plane.

4. The field marker of claim 3, wherein said inner arm is positioned substantially parallel to a side of said implement frame when in a storage position.

5. The field marker of claim 4, wherein said outer arm pivots along a substantially vertical plane which is parallel to said inner arm.

6. The field marker of claim 5, wherein:
    a first line is fluidly connected to a first end of said first hydraulic cylinder and fluidly connectable to a hydraulic system of a tractor;
    a second line is fluidly connected between a second end of said first hydraulic cylinder and a first end of said second hydraulic cylinder; and
    a third line is fluidly connected to a second end of said second hydraulic cylinder and fluidly connectable to said hydraulic system of said tractor.

7. The field marker of claim 1, wherein said first hydraulic cylinder is larger in diameter than said second hydraulic cylinder which forces said second hydraulic cylinder to operate at the same speed as said first hydraulic cylinder.

8. The field marker of claim 7, wherein said first hydraulic cylinder is comprised of a rephasing hydraulic cylinder for allowing said second hydraulic cylinder to completely extend or retract.

9. The field marker of claim 8, wherein said connecting means is comprised of a connecting member pivotally connected between said second hydraulic cylinder and said outer arm, wherein when said second hydraulic cylinder is fully extended said outer arm may freely move upwardly and downwardly.

10. The field marker of claim 9, including at least one Y-shaped support member attached to an upper surface of said inner arm for receiving and supporting said outer arm when in a storage position.

11. The field marker of claim 10, including a locking member pivotally attached near said Y-shaped support member for retaining said outer arm within said Y-shaped support member.

12. The field marker of claim 11, including a pair of elbow members pivotally attached to said distal end of said inner arm and securing said outer arm, wherein said connecting member is pivotally attached centrally between said pair of elbow members.

13. A field marker, comprising:
    an inner arm having a proximal end and a distal end, wherein said proximal end is pivotally attached to a bracket means which is attachable to an implement frame;
    an outer arm having a proximal end and a distal end, wherein said proximal end of said outer arm is pivotally attached to said distal end of said inner arm;
    a marking means attached to said distal end of said outer arm;
    a first hydraulic cylinder attached between said implement frame and said inner arm, wherein said first hydraulic cylinder pivots said inner arm with respect to said implement frame;

a second hydraulic cylinder attached between said inner arm and said outer arm, wherein said second hydraulic cylinder pivots said outer arm with respect to said inner arm; and wherein said first hydraulic cyclinder and said second hydraulic cylinder are fluidly connected in series to one another so that they operate substantially simultaneously to extend or retract said inner arm and said outer arm with respect to said implement frame.

14. The field marker of claim 13, including a connecting means attached between said second hydraulic cylinder and said outer arm, wherein said connecting means allows said outer arm to freely pivot with respect to said inner arm when fully extended.

15. The field marker of claim 14, wherein said inner arm pivots along a substantially horizontal plane and said outer arm pivots along a substantially vertical plane, wherein said vertical plane is parallel to said inner arm.

16. The field marker of claim 15, wherein:

a first line is fluidly connected to a first end of said first hydraulic cylinder and fluidly connectable to a hydraulic system of a tractor;

a second line is fluidly connected between a second end of said first hydraulic cylinder and a first end of said second hydraulic cylinder; and a third line is fluidly connected to a second end of said second hydraulic cylinder and fluidly connectable to said hydraulic system of said tractor.

17. The field marker of claim 16, wherein said first hydraulic cylinder is larger in diameter than said second hydraulic cylinder which forces said second hydraulic cylinder to operate at the same speed as said first hydraulic cylinder.

18. The field marker of claim 17, wherein said first hydraulic cylinder is comprised of a rephasing hydraulic cylinder for allowing said second hydraulic cylinder to completely extend or retract.

* * * * *